US 6,618,898 B2

(12) United States Patent
Tingle

(10) Patent No.: US 6,618,898 B2
(45) Date of Patent: Sep. 16, 2003

(54) ANIMAL WASTE VACUUM

(76) Inventor: Charles Wayne Tingle, 11094 W. 85th Pl., Arvada, CO (US) 80005

(*) Notice: Subject to any disclaimer, the term of this patent is extended or adjusted under 35 U.S.C. 154(b) by 111 days.

(21) Appl. No.: 09/946,229

(22) Filed: Sep. 5, 2001

(65) Prior Publication Data

US 2003/0046789 A1 Mar. 13, 2003

(51) Int. Cl.[7] .................................................. A47L 9/00
(52) U.S. Cl. .......................... 15/347; 15/327.7; 15/352
(58) Field of Search ................................. 15/327.7, 347, 15/352

(56) References Cited

U.S. PATENT DOCUMENTS

| | | | | |
|---|---|---|---|---|
| 980,944 A | * | 1/1911 | Hatch et al. ................... | 15/347 |
| 3,083,396 A | * | 4/1963 | Senne et al. ................. | 15/327.7 |
| 3,755,992 A | * | 9/1973 | Ylinen ....................... | 15/327.7 |
| 3,790,986 A | * | 2/1974 | Burger ......................... | 15/347 |
| 4,072,483 A | * | 2/1978 | Doyle, Jr. ..................... | 15/347 |
| 4,185,355 A | | 1/1980 | Williams | |
| 4,478,448 A | | 10/1984 | Albert | |
| 4,715,872 A | * | 12/1987 | Snyder ......................... | 15/347 |
| 4,723,971 A | * | 2/1988 | Caldas ......................... | 15/347 |
| 5,144,716 A | * | 9/1992 | Watanabe et al. ........... | 15/327.7 |
| 5,224,238 A | * | 7/1993 | Bartlett ....................... | 15/327.7 |
| 5,581,842 A | * | 12/1996 | Seith ........................... | 15/347 |
| 5,661,873 A | | 9/1997 | Karet | |
| 5,771,531 A | | 6/1998 | Swartz | |
| 5,771,532 A | * | 6/1998 | Munnoch ..................... | 15/347 |
| 6,115,879 A | | 9/2000 | Mitchell | |
| 6,261,331 B1 | * | 7/2001 | Fleurier et al. ............... | 15/347 |

* cited by examiner

Primary Examiner—Theresa T. Snider

(57) ABSTRACT

An animal waste vacuum having a main body mounted upon wheels and a handle to maneuver vacuum's nozzle opening and intake tube over animal excrement. A vacuum motor creates suction and draws animal excrement through a nozzle opening and up an intake tube into a waste bag. A waste bag, in which the animal excrement is collected, prevents animal waste from contacting any component of the vacuum. A plastic tubing dispenser ring fits over the intake tube and contains thin plastic tubing that acts as a liner in the intake tube during use. The liner prevents animal excrement from contacting the interior of the intake tube during use. Alternative liners, such as common plastic grocery bags, may also be used. The waste bag and intake tube are accessible through a removable lid. The intake tube is removable and easy to clean. The animal waste vacuum is used from a standing position. The animal waste vacuum's weight rests entirely upon its wheels during operation, and the vacuum's design permits the user to efficiently, conveniently, easily, and cleanly remove animal excrement.

20 Claims, 2 Drawing Sheets

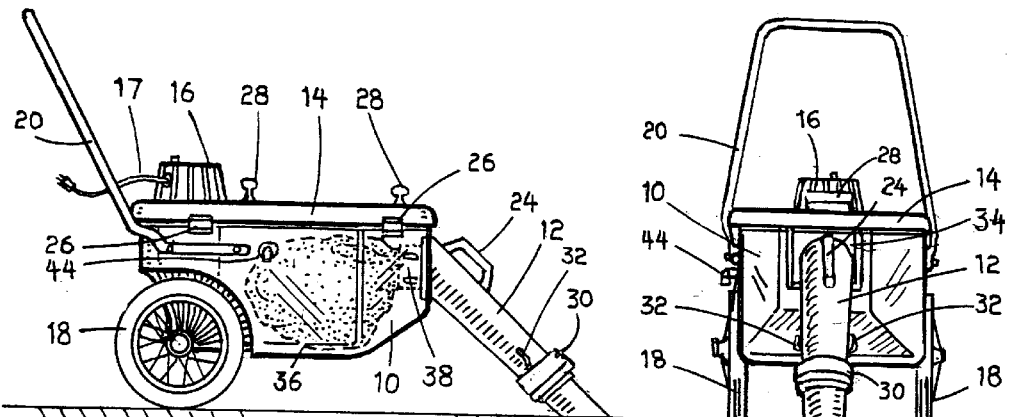
FIG. 3
FIG. 4
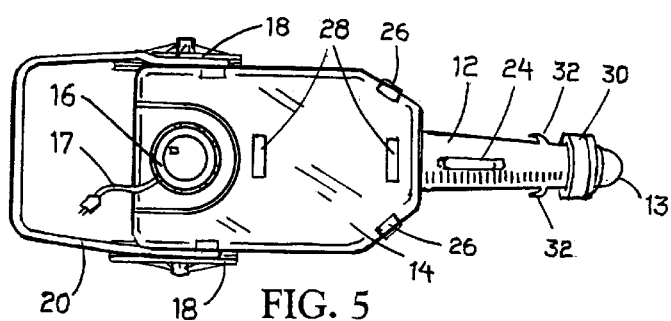
FIG. 5
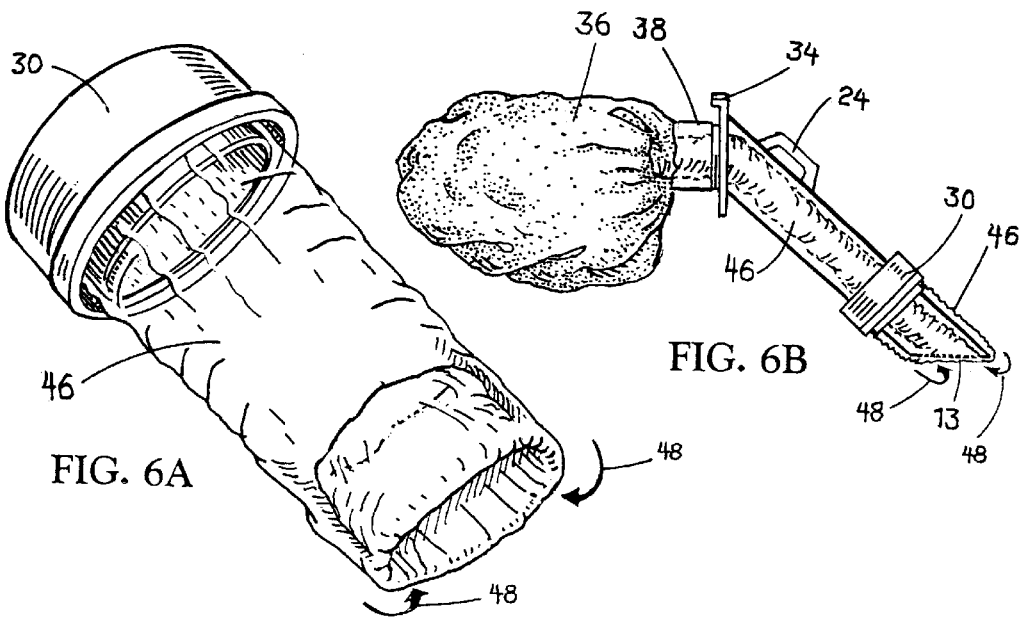
FIG. 6A
FIG. 6B

ANIMAL WASTE VACUUM

BACKGROUND OF THE INVENTION (a) Field of the Invention

This invention relates generally to animal waste removal devices and more particularly, but not by way of limitation, to animal waste vacuums for removing dog and other animal excrement from lawns, animal runs, kennels, and other property.

(b) Discussion of Prior Art

People who are responsible for the care of pets and animals, especially dogs, must regularly clean up excrement from yards and other areas where the animals defecate. The task of removing animal excrement from lawns, animal runs, kennels, and other property is typically difficult, messy, and unpleasant. Inventors have attempted to design efficient tools and automated devices to assist in the unpleasant task of cleaning up animal excrement, but have been largely unsuccessful. Current devices which are used to pick up and dispose of animal excrement are cumbersome, inconvenient, and inefficient. Known apparatus used to remove animal excrement from yards and other locations are difficult to maneuver and keep clean.

In U.S. Pat. No. 4,185,355 to Williams, U.S. Pat. No. 5,771,531 to Swartz, and U.S. Pat. No. 5,661,873 to Karet three different types of automated apparatus are disclosed for the removal of animal feces. In addition, U.S. Pat. No. 6,115,879 to Mitchell, and U.S. Pat. No. 4,478,448 to Albert disclose a general use vacuum and piston driven vacuum respectively.

U.S. Pat. No. 4,185,355 discloses a hand-held vacuum with a downward facing opening at one end that must be placed directly on top of the animal feces in order to operate properly. In order to place this hand-held vacuum directly on top of the animal feces the operator must bend completely over. The vacuum has limited size due to its configuration and could not be used to remove large quantities of excrement. The vacuum would, therefore, have to be emptied on a very frequent basis causing inconvenience and cost to the user, thus defeating its initial purpose. The vacuum's design is also flawed in that the position of the bag and interior of the vacuum would not prevent the animal excrement from falling out of the opening once it has been vacuumed and the vacuum is turned off.

U.S. Pat. No. 5,771,531 discloses a hand-held vacuum with an elongated intake tube that does not require the user to bend over great distance to pick up animal feces. The design of this vacuum, however, requires a sufficiently powerful vacuum motor to pull animal excrement the extended length of the elongated intake tube. The design of this vacuum would allow animal excrement to be drawn into the vacuum motor before the excrement is dropped into a receptacle. To clean the elongated tube water would have to been injected into the tube, and the length of the tube impedes thorough cleaning. Nothing in the design would prevent animal waste from contacting the interior of the main housing and keeping the apparatus clean would be difficult. The vacuum is designed to be hand-held, and therefore would have to be emptied frequently due to the weight of excrement and necessary size of the vacuum motor regardless of whether it is battery, gasoline, or electrically powered.

U.S. Pat. No. 5,661,873 discloses another hand-held animal waste vacuum. This vacuum is designed to be held in one hand. Vacuum motors of sufficient size to pull animal excrement, wet or dry, up a tube and into a receptacle have significant weight, which renders a hand-held vacuums impractical. That design feature, by necessity, seriously limits the capacity of the waste receptacle. Animal waste may have substantial weight of its own, especially depending on its state, wet or dry. Weight limitations will impact the typical operator who can only use one hand to carry the vacuum apparatus and waste. Therefore, the design of this vacuum would necessitate frequent emptying which is inconvenient and inefficient. The patent for this vacuum states that the intake tube should be disposed of after every use for sanitation reasons. Disposal of the intake tube after every use is wasteful, environmentally unfriendly, and financially prohibitive.

U.S. Pat. No. 6,115,879 discloses a general use vacuum used for debris such as cigarette and cigar butts, twigs, pine cones, and excrement of animals and birds. It is designed to be hand-held and its main container is divided into two compartments. Because the vacuum is hand-held its holding capacity is limited and constrained by the weight of the vacuum motor and the remainder of the apparatus. Therefore, the vacuum would have to be emptied on a frequent basis causing inconvenience to the user. The interior of the vacuum's intake tube is unprotected and would become contaminated by animal waste. No easy and efficient cleaning mechanism is provided for by which to sanitize the interior of the tube. The filters which are placed in the interior of the canister would become blocked if wet animal waste were drawn into the apparatus. Removal of the filters and animal waste could not be accomplished easily and without great care to avoid contact with feces.

U.S. Pat. No. 4,478,448 discloses an animal excrement removal device featuring a spring-loaded piston that creates a vacuum when triggered. Animal excrement is pulled into a tube a short distance where it is held in a receptacle at ground level near the end of the elongated tube. The device would require substantial strength to operate the spring-loaded piston, and does not provide for the easy removal of the trapped animal excrement, which must be retrieved from the end of the elongated tube. The device is cumbersome and unwieldy.

None of the above mentioned patents disclose the unique combination of features, advantages, objects, structure and function of the subject animal waste vacuum as described herein.

SUMMARY OF THE INVENTION

In view of the foregoing, the intent of the present invention is to provide several objects and advantages over prior art. Accordingly, several objects and advantages of my present invention are:

(a) to provide an animal waste vacuum mounted on wheels and steered or directed with a handle. The wheels support the entire weight of the apparatus, vacuum motor, and collected animal waste. An operator can easily maneuver the vacuum, from a fully upright and standing position, with a handle for extended periods without tiring or bending over during operation. The wheel mounted animal waste vacuum provides greater flexibility in manufacturing, in that vacuums may be manufactured in larger sizes for commercial use, and smaller sizes for small jobs, without serious concerns about weight limitations;

(b) to provide an animal waste vacuum which is capable of handling large jobs, private or commercial, without the need for frequent emptying. The main body of the vacuum will be manufactured with a deep and wide cavity to accommodate a large waste bag capable of holding large quantities of animal excrement;

(c) to provide an animal waste vacuum which prevents contact between the vacuum's non-disposable components and animal feces, and is easy to clean after use. The interior of the intake tube, through which animal waste is drawn by a vacuum motor, is protected by a liner during normal operation. The intake tube is short and easy to clean if the operator chooses not to use a liner during operation;

(d) to provide an animal waste vacuum which has a plastic tubing dispenser ring that slides over the exterior of the intake tube a short distance where it attaches to the intake tube. The plastic tubing dispenser ring contains a compressed thin plastic tube which can be pulled out a length equal to the length of the intake tube. The length of thin plastic tube is then stuffed into the nozzle opening of the intake tube so that when the vacuum is activated the thin plastic tube is drawn by the vacuum up the entire length of the intake tube. Once in place the thin plastic tube acts as a protective liner within the intake tube during operation, and thus prevents any animal waste from contacting any portion of the interior of the intake tube. Once the operator has completed the task of removing animal or dog excrement with the vacuum, the thin plastic tube is separated from the remainder of plastic tubing within the plastic tubing dispenser ring. This may be accomplished by tearing the plastic tubing at a perforation or by cutting the plastic. At that point in the operation the user may activate the vacuum and draw the plastic tubing, which had been the liner in the intake tube, into the waste bag where it is disposed of with the animal waste. The plastic tubing dispenser ring is removable and after its supply of thin plastic tubing is exhausted may be replaced with a new plastic tubing dispenser ring;

(e) to provide an animal waste vacuum which has two hooks on the exterior of the intake tube which allow the operator to use an alternative liner to the plastic tubing from the plastic tubing dispenser ring. The hooks allow a user to affix the handles of a common plastic grocery bag to the side of the intake tube. Once the plastic grocery bag is attached, one can snip the bottom end of the bag and place the remainder of the bag at the nozzle opening of the intake tube. When the vacuum is activated the bag is drawn up the intake tube. The plastic grocery bag acts as a liner and prevents animal waste from contacting the interior of the intake tube;

(f) to provide an animal waste vacuum which has a removable short intake tube which can be quickly and easily cleaned after use for operators who choose not to use the plastic tubing dispenser ring which holds a thin plastic tube or the plastic grocery bag as intake tube liners;

(g) to provide an animal waste vacuum that deposits the animal waste into a disposable waste bag and prevents any animal waste from being drawn into the vacuum motor;

(h) to provide an animal waste vacuum that allows quick and easy access to the vacuum waste bag, through a removable lid. The removable lid makes removal and replacement of the waste bag quick and easy.

(i) to provide an animal waste vacuum that can be used by private persons, kennel owners, zoo keepers or any other person for big and small jobs alike.

BRIEF DESCRIPTION OF THE DRAWINGS

The foregoing and still other objects and advantages of the present invention will be more apparent from the following detailed explanation of the invention in connection with the accompanying drawings wherein:

FIG. 3 is a side elevation view of the animal waste vacuum;

FIG. 4 is a front elevation view of the animal waste vacuum;

FIG. 5 is a top view of the animal waste vacuum;

FIG. 6A is a fragmentary view showing the plastic tubing dispenser ring attachment with thin plastic tubing pulled outward and tucked inward to demonstrate how the plastic tubing will draw up the intake tube when vacuum is activated;

FIG. 6B is a fragmentary view illustrating the plastic tubing dispenser ring attached to intake tube with plastic tubing in place and protecting inside of intake tube with waste bag attached;

REFERENCE NUMERALS IN DRAWINGS

| | |
|---|---|
| 10 | main body |
| 12 | intake tube |
| 13 | nozzle opening |
| 14 | lid |
| 16 | vacuum motor |
| 17 | power cord |
| 18 | wheels |
| 20 | handle |
| 24 | intake tube handle |
| 26 | latches |
| 28 | lid handles |
| 30 | plastic tubing dispenser ring |
| 32 | hooks |
| 34 | ridge |
| 36 | waste bag |
| 38 | collar |
| 42 | nodules |
| 44 | air exhaust port |
| 46 | thin plastic tubing |
| 48 | arrows showing movement of plastic tubing |

DETAILED DESCRIPTION OF PREFERRED EMBODIMENTS

Figure 1:
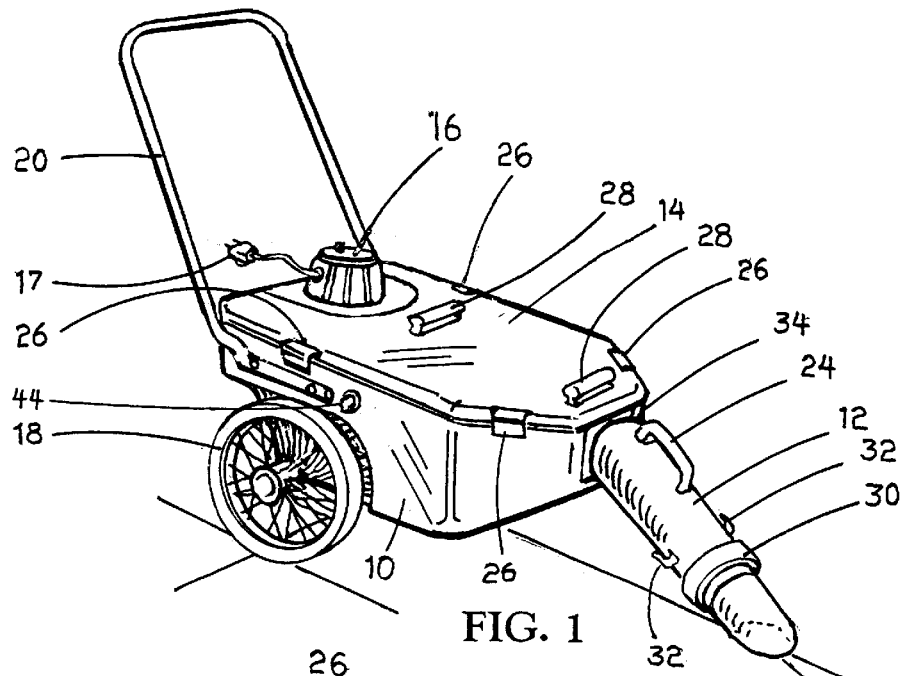
FIG. 1 is a perspective view of the animal waste vacuum.
Figure 2:
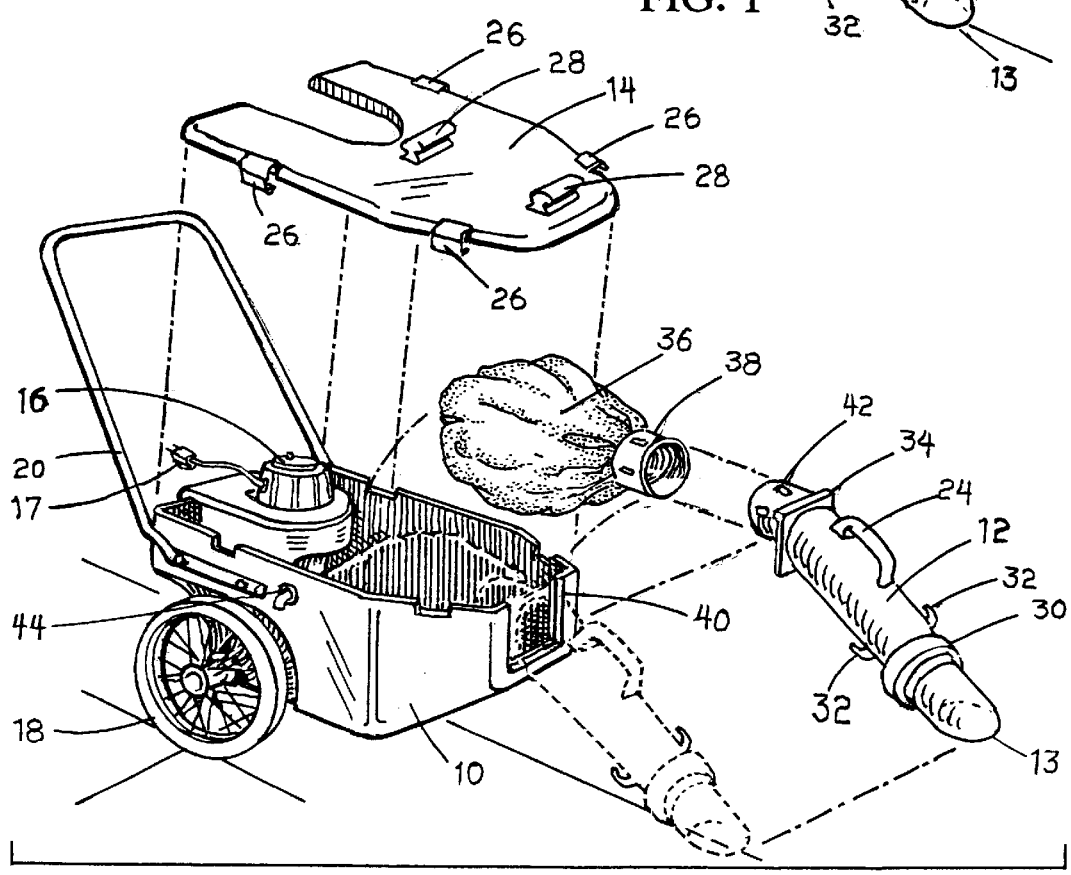
FIG. 2 is an exploded perspective view of the animal waste vacuum illustrating disassembly of the vacuum, and its primary components.

FIG. 1 shows a perspective view of the animal waste vacuum in its preferred embodiment. FIGS. 3, 4, and 5 show a side, front, and top view of the animal waste vacuum respectively. The vacuum is comprised of a main body 10, mounted on two wheels 18. The main body 10 of the vacuum is made of light weight plastic, and has a powered vacuum motor 16 attached internally and to the rear of the main body 10. The powered vacuum motor 16 can be electric or gasoline and creates suction airflow sufficient to draw animal excrement up the length of intake tube 12. For an electrically powered vacuum motor, a power cord 17 runs from the vacuum motor 16 to any electrical outlet. An air exhaust port 44 is built into one side of main body 10. An intake tube 12 extends from the front of the main body 10 to the surface of the ground. The intake tube 12 has openings at both ends and is hollow to allow waste to travel from the ground, through the nozzle opening 13 and intake tube 12, and finally into a waste bag 36, as depicted in FIG. 2, FIG. 3, and FIG. 6B. The intake tube 12 slides into place at the front of the main body 10 and is removable. The intake tube 12 has an affixed ridge 34, which slides into a groove 40 at the front of the main body 10. A lid 14 fits tightly over the top of the main body 10 and is held in place by four latches 26. The lid 14, when latched down to main body 10, will hold intake tube 12 in place. Two lid handles 28 are attached to the top surface of lid 14 and assist the operator in removing and replacing lid 14 from its position on main body 10.

A handle 20, is attached to the rear of main body 10 and is used by the operator to push, pull, and otherwise maneuver the vacuum.

FIG. 2 shows a perspective view of the animal waste vacuum with main components disassembled. The dashed lines illustrate waste bag 36 and intake tube 12 in their respective locations during vacuum operation. The solid lines in FIG. 2 illustrate main body 10, that has sides and a bottom defining an interior cavity with an open top, and non-removable components, as well as the removable components intake tube 12, waste bag 36, and lid 14. FIG. 2 shows how a user can gain access to waste bag 36 and intake tube 12 after removing lid 14. Access to the interior of main body 10 is accomplished by releasing tour latches 26, which hold lid 14 in place during operation of the animal waste vacuum. After lid 14 is removed from main body 10, intake tube 12 can be removed form main body 10 by sliding ridge 34 out of groove 40 at the front of main body 10. Intake tube 12 has a handle 24 affixed to its top surface to assist in manipulating intake tube 12. A waste bag 36 is attached to the intake tube 12 by a collar 38 which fits over an opening of the intake tube 12. A collar 38 on waste bag 36 is held in place on intake tube 12 by nodules 42 on the receiving end of intake tube 12. The collar 38 fits over nodules 42 which will hold waste bag 36 to intake tube 12 during vacuum operation.

The waste bag 36 and collar 38 slide over the end of the intake tube 12 closest to the vacuum motor 16. The waste bag 36, when affixed to the intake tube 12 and ready for vacuum operation, fits inside of the main body 10.

A plastic tubing dispenser ring 30 is a separate component which is a cylindrical plastic container designed to hold a long length of thin plastic tubing 46. The thin plastic tubing 46 is in a compressed state while contained in the plastic tubing dispenser ring 30 prior to use. The plastic tubing dispenser ring 30 slides over intake tube 12 and attaches at lower quarter of intake tube 12 during use. Prior to vacuum operation, a portion of the thin plastic tubing 46 is pulled from plastic tubing dispenser ring 30 towards nozzle opening 13 of intake tube 12 and placed just inside of nozzle opening 13 of intake tube 12. Activation of the vacuum motor 16 draws the thin plastic tubing 46 from plastic tubing dispenser ring 30 up the entire length of intake tube 12 and serves as a liner protecting the interior of intake tube 12 from contact with animal waste.

Hooks 32 provide an alternative method to place a plastic liner inside of intake tube 12. The hooks 32 will hold the handles of common plastic grocery bag. The bottom of the plastic grocery bag is cut off and the bag is stuffed into nozzle opening 13 of intake tube 12. When activated the vacuum draws the grocery bag, minus the bottom, into the intake tube 12 and the grocery bag serves as a liner. The hooks 32 hold the plastic grocery bag handles in place and prevent the bag from being sucked into the waste bag 36 during vacuum operation.

FIG. 3 is a side view of the animal waste vacuum. FIG. 3 shows, by dashed lines, waste bag 36 and collar 38 within main body 10 in position and ready for use as attached to intake tube 12.

FIG. 6A is a view of the plastic tubing dispenser ring 30 and a length of thin plastic tubing 46 extracted from plastic tubing dispenser ring 30. The thin plastic tubing 46 is turned up and inside to illustrate how the thin plastic tubing 46 inserts into the intake tube 12 to act as a protective liner. Arrows 48 in FIGS. 6A and 6B demonstrate proper movement of thin plastic tubing 46 to act as liner in intake tube 12.

FIG. 6B is a view of intake tube 12 with plastic tubing dispenser ring 30 attached and in place. In FIG. 6B thin plastic tubing 46 is pulled from the plastic tubing dispenser ring 30 and has been drawn up intake tube 12 by vacuum motor 16. The thin plastic tubing 46 lines the interior length of intake tube 12 from nozzle opening 13 to waste bag 36.

The operation of the present invention for its intended purpose is as follows. Prior to operation of the animal waste vacuum, lid 14 is removed from main body 10 to give user access to interior of main body 10 and intake tube 12. A waste bag 36 is connected to intake tube 12 by fitting collar 38 of waste bag 36 over nodules 42 on intake tube 12. The nodules 42 on intake tube 12 hold waste bag 36 by collar 38 in place during vacuum operation. The user connects intake tube 12 to main body 10 by sliding ridge 34 into groove 40 of main body 10. The lid 14 is then fitted over main body 10 and locked into place by latches 26 which affix to main body 10. The lid 14, when latched down to main body 10, holds intake tube 12 and waste bag 36 in place. Prior to vacuum activation, the user should pull a length of thin plastic tubing 46 from plastic tubing dispenser ring 30, as shown in FIG. 6A, sufficient in length to protect the interior of intake tube 12. Once the appropriate length of thin plastic tubing 46 is pulled from plastic dispenser ring 30, the user stuffs it into nozzle opening 13 of intake tube 12.

Upon activation of the animal waste vacuum, FIG. 6B shows how the length of thin plastic tubing 46 from plastic tubing dispenser ring 30 is drawn up intake tube 12 from the nozzle opening 13 to waste bag 36.

An alternative to using the liner from plastic tubing dispenser ring 30, is to not use a liner at all or to use a common plastic grocery bag. The bottom of a common plastic grocery bag may be cutoff with scissors and the handles of the grocery bag placed over hooks 32. The remaining part of the plastic grocery bag is then stuffed into nozzle opening 13 of intake tube 12. Upon activation of the vacuum, the plastic grocery bag is drawn up the interior of intake tube 12 and acts as a protective liner just as the thin plastic tubing 46 from plastic tubing dispenser ring 30.

The operator then pushes and guides the animal waste vacuum with handle 20 to locations where there is animal excrement. By guiding the animal waste vacuum with handle 20, the operator can lower the intake tube 12 and nozzle opening 13 directly over animal feces.

The animal excrement will be drawn by vacuum motor 16 from the ground, up intake tube 12, and into waste bag 36. All animal excrement, which is vacuumed up, will go into waste bag 36. The waste bag 36 prevents any animal excrement from contacting the interior of main body 10 or vacuum motor 16. When the operator is ready to dispose of waste bag 36, and after the vacuum is turned off, the length of thin plastic tubing 46, if in use, is torn or cut from plastic tubing dispenser ring 30. The vacuum should be activated again which will suck the previously used thin plastic tubing 46 into waste bag 36 with any collected animal waste. If a common grocery bag was in use as a liner, then it may be removed from hooks 32 and similarly drawn into waste bag 36 after use.

To gain access to waste bag 36 for disposal, when it is full or at any other time, the operator releases latches 26 and removes lid 14 by lid handles 28. Waste bag 36 is separated from intake tube 12 by pulling collar 38 away from intake tube 12. Waste bag 36 is then ready for disposal. If the operator used the animal waste vacuum without having a plastic liner of any kind in place, intake tube 12 may be cleaned easily. Intake tube 12 is removed from main body 10 by pulling up on intake tube handle 24. Ridge 34 will slide out of groove 40 and intake tube 12 can be cleaned out by using a common garden hose.

While the invention has been shown, described and illustrated in detail with reference to the preferred embodiments and modifications thereof, it should be understood by those skilled in the art that equivalent changes in form and detail may be made therein without departing from the true spirit and scope of the invention as claimed, except as precluded by the prior art.

Conclusion, Ramifications, and Scope

Accordingly, the reader will see that the animal waste vacuum of this invention can be used to pick up and dispose of animal waste easily, conveniently, and cleanly. The animal waste vacuum of this invention is mounted on wheels, easy to use, sanitary, and equipped with a handle for maneuvering. An operator of this vacuum can remain standing and fully upright during operation. The wheels, upon which the animal waste vacuum is mounted, support the weight of the vacuum, as well as all collected waste, and make guiding the vacuum with the handle convenient and easy. An operator will be able to work longer hours with this vacuum, and for longer periods between emptying the waste bag. Furthermore, the animal waste vacuum has additional advantages in that;

the cavity of the main body can be manufactured in large and small sizes to fit consumer's needs;

the cavity of the main body can be manufactured to contain very large waste bags capable of collecting large quantities of animal waste which alleviates the need for frequent emptying;

the operator of the vacuum can direct the nozzle opening of the intake tube directly over animal feces without having to bend down;

a plastic liner dispenser ring fits over the intake tube and allows the operator to use the thin plastic tubing which it contains as a protective liner to prevent animal waste from contacting any component of the apparatus;

a common plastic grocery bag may also be used as liner in the intake tube as an alternative to the plastic tubing from the plastic tubing dispenser ring;

the vacuum's operator may also choose to use the vacuum with no protective liner at all;

the intake tube is short, removable, and can be easily cleaned; and the interior of the main body is easily accessed through a removable lid, which is equipped with handles, where the user has unobstructed access to the intake tube and waste bag;

a waste bag collects all animal excrement and prevents any excrement from contacting the vacuum motor.

Although the description above contains many specificities, these should not be construed as limiting the scope of the invention but as merely providing illustrations of some of the presently preferred embodiments of this invention.

Thus the scope of the invention should be determined by the appended claims and their legal equivalents, rather than by the examples given.

What is claimed is:

1. An animal waste vacuum used for removing animal excrement from lawns, animal runs, kennels, and other property, comprising:
   (a) a main body having sides and a bottom defining an interior cavity with an open top,
   (b) a lid removably attachable to said open top,
   (c) an intake tube, having a length and an interior, removably attachable at one end to said main body and in communication with the interior cavity, the other end extending towards a ground surface,
   (d) a vacuum motor attached to said main body to create suction airflow sufficient to draw animal excrement from the ground surface up the length of said intake tube and deposit it into said interior cavity, and
   (e) a plastic tubing dispenser ring removably attachable to said intake tube having plastic tubing used to line the interior of said intake tube to prevent animal excrement from contacting said intake tube.

2. The vacuum of claim 1 further comprising a plurality of wheels affixed to said main body for enabling movement thereof.

3. The vacuum of claim 1 further comprising a handle attached to said main body for directing movement thereof.

4. The vacuum of claim 1 further comprising a waste bag removably attachable to said intake tube and disposed in the interior cavity for the collection of animal excrement.

5. The vacuum of claim 1 further comprising a plurality of hooks attached to said intake tube for affixing plastic grocery bags to be used as protective liners for said intake tube.

6. An animal waste vacuum used for removing animal excrement from lawns, animal runs, kennels, and other property, comprising:
   (a) a main body having sides and a bottom defining an interior cavity with an open top,
   (b) a lid removably attachable to said open top,
   (c) an intake tube, having a length and an interior, removably attachable at one end to said main body and in communication with the interior cavity, the other end extending towards a ground surface,
   (d) a vacuum motor attached to said lid to create suction airflow sufficient to draw animal excrement from the ground surface up the length of said intake tube and deposit it into said interior cavity, and
   (e) a plastic tubing dispenser ring removably attachable to said intake tube having plastic tubing used to line the interior of said intake tube to prevent animal excrement from contacting said intake tube.

7. The vacuum of claim 6 further comprising a plurality of wheels affixed to said main body for enabling movement thereof.

8. The vacuum of claim 6 further comprising a handle attached to said main body for directing movement thereof.

9. The vacuum of claim 6 further comprising a waste bag removably attachable to said intake tube and disposed in the interior cavity for the collection of animal excrement.

10. The vacuum of claim 6 further comprising a plurality of hooks attached to said intake tube for affixing plastic grocery bags to be used as protective liners for said intake tube.

11. An animal waste vacuum used for removing animal excrement from lawns, animal runs, kennels, and other property, comprising:
  (a) a main body having sides and a bottom defining an interior cavity with an open top,
  (b) a lid removably attachable to said open top,
  (c) an intake tube, having a length and an interior, removably attachable at one end to said main body and in communication with the interior cavity, the other end extending towards a ground surface,
  (d) a vacuum motor attached to said lid to create suction airflow sufficient to draw animal excrement from the ground surface up the length of said intake tube and deposit it into said interior cavity, and
  (e) a protective liner dispensing means removably attachable to said intake tube having a protective liner for preventing animal excrement from contacting said intake tube.

12. The vacuum of claim 11 further comprising a plurality of wheels affixed to said main body for enabling movement thereof.

13. The vacuum of claim 11 further comprising a handle attached to said main body for directing movement thereof.

14. The vacuum of claim 11 further comprising a waste bag removably attachable La said intake tube and disposed in the interior cavity for the collection of animal excrement.

15. The vacuum of 11 wherein said vacuum motor is electrically powered.

16. The vacuum of 11 wherein said vacuum motor is gasoline powered.

17. An animal waste vacuum used for removing animal excrement from lawns, animal runs, kennels, and other property, comprising:
  (a) a main body having sides and a bottom defining an interior cavity with an open top,
  (b) a lid removably attachable to said open top,
  (c) an intake tube, having a length and an interior, removably attachable at one end to said main body and in communication with the interior cavity, the other end extending towards a ground surface,
  (d) a vacuum motor attached to said main body to create suction airflow sufficient to draw animal excrement from the ground surface up the length of said intake tube and deposit it into said interior cavity, and
  (e) a protective liner dispensing means removably attachable to said intake tube having a protective liner for preventing animal excrement from contacting said intake tube.

18. The vacuum of claim 17 further comprising a plurality of wheels affixed to said main body for enabling movement thereof.

19. The vacuum of claim 17 further comprising a handle attached to said main body for directing movement thereof.

20. The vacuum of claim 17 further comprising a waste bag removably attachable to said intake tube and disposed in the interior cavity for the collection of animal excrement.

* * * * *